United States Patent [19]

Kishi et al.

[11] Patent Number: 5,259,965
[45] Date of Patent: Nov. 9, 1993

[54] TITANIUM LUBRICATING MATERIAL SUITABLE FOR USE IN VACUUM

[75] Inventors: Katsuhiro Kishi; Yoshiteru Yasuda, both of Yokosuka, Japan

[73] Assignee: Nissan Motor Co., Ltd., Kanagawa, Japan

[21] Appl. No.: 759,363

[22] Filed: Sep. 13, 1991

[30] Foreign Application Priority Data

Sep. 21, 1990 [JP] Japan ............................. 2-253196

[51] Int. Cl.⁵ ............................................ F16C 33/06
[52] U.S. Cl. .................................... 252/12.2; 252/10; 252/11; 252/12; 252/25; 252/26
[58] Field of Search .................... 252/12, 12.2, 10, 11

[56] References Cited

U.S. PATENT DOCUMENTS 3,540,862 11/1970 Roemer ...................... 252/12.2
3,685,878 8/1972 Orkin ........................... 308/238
3,869,393 3/1975 Booker ........................ 252/12.2

FOREIGN PATENT DOCUMENTS 1-205072 2/1988 Japan .
1-261561 4/1988 Japan .
1114698 5/1968 United Kingdom .
1259672 1/1972 United Kingdom .

Primary Examiner—Ellen M. McAvoy
Attorney, Agent, or Firm—Pennie & Edmonds

[57] ABSTRACT

To provide a lubricating material suitable for use in space or vacuum, light in weight, low in friction coefficient and long in life time, oxidation treatment is effected on the surface of titanium or titanium alloy substrate before a solid lubricating film is applied to the substrate. The formed oxide ($Ti_2O$) can strengthen bonding force between the substrate (Ti) and the solid lubricating film (e.g. $MoS_2$).

8 Claims, 3 Drawing Sheets

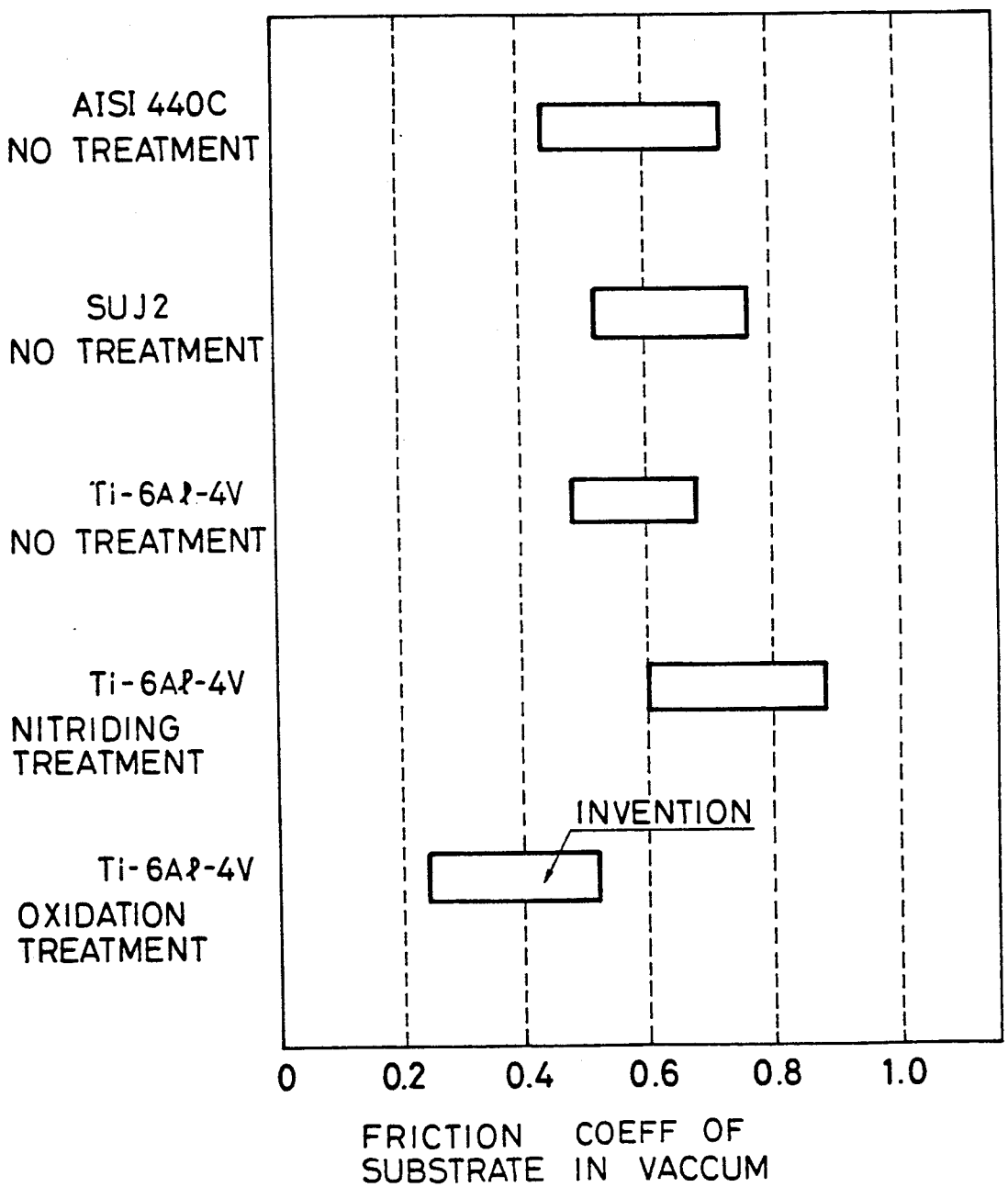

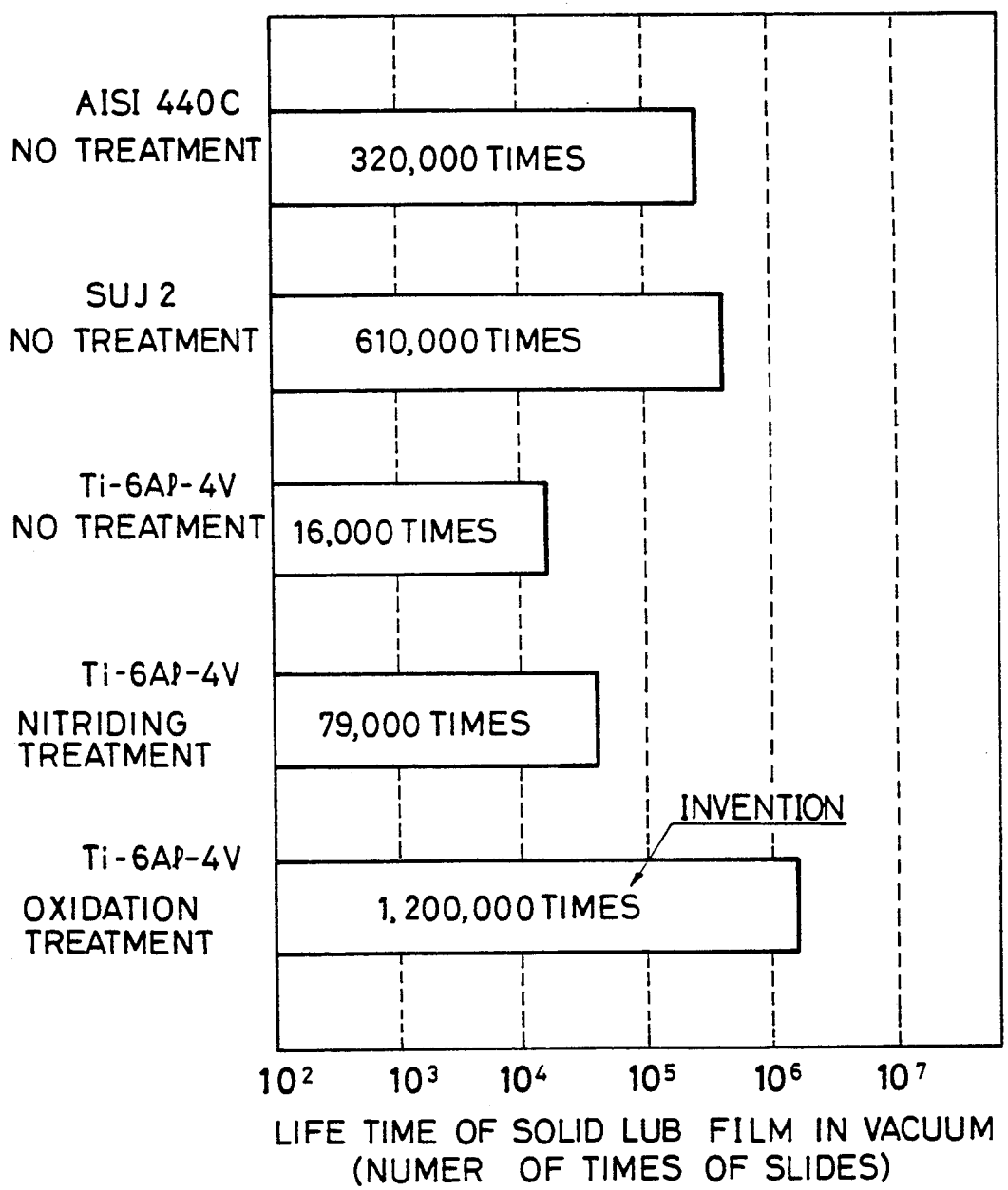

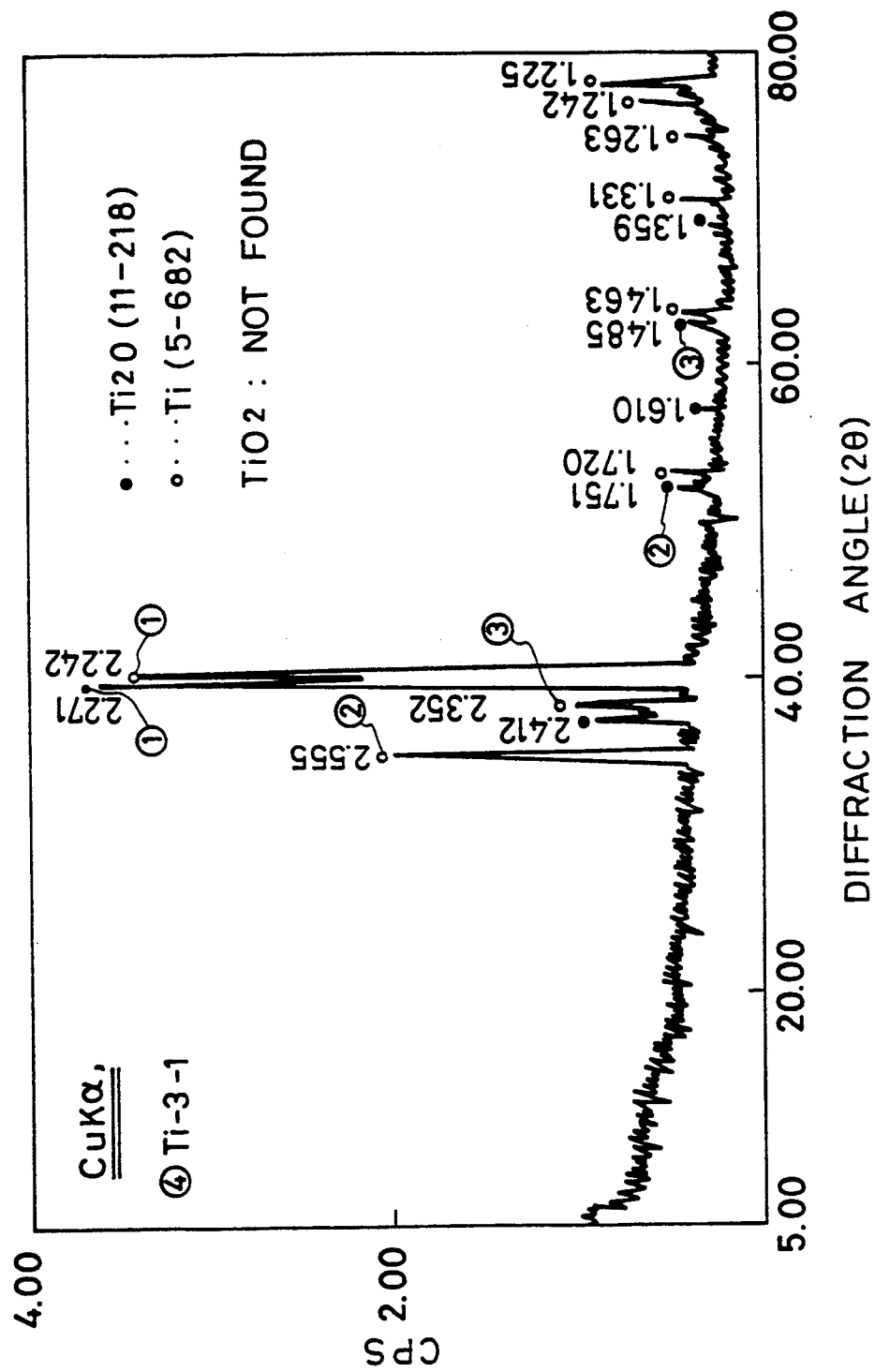

TITANIUM LUBRICATING MATERIAL SUITABLE FOR USE IN VACUUM

BACKGROUND OF THE INVENTION

1. Field of the Invention

The present invention relates to titanium lubricating material suitable for use in vacuum as light material for constructing a space station, for example, and more specifically to a technology of improvement in surface quality of lubricating material usable for analysis instruments used in space or vacuum.

2. Description of the Prior Art

Conventionally there exist martensite-based stainless steels (e.g. AISI440C), high-chromium bearing steels (e.g. SUJ2), etc., as lubricating material suitable for use in vacuum.

To improve the surface quality of these substrates, the following technologies have been so far proposed:

(1) Nitriding onto the surface thereof (as disclosed in Japanese Published Unexamined (Kokai) Pat. Appli. No. 1-261561), and (2) Ion implantation onto the surface thereof (as disclosed in Japanese Published Unexamined (Kokai) Pat. Appli. No. 1-205072).

In the prior-art lubricating material suitable for use in vacuum, since the substrate is made of iron, there exists a problem in that the weight thereof inevitably increases.

Further, when light alloy such as aluminium alloy or titanium alloy is used in such an environment, since the substrate is soft and therefore there exists a big difference in elastic deformation rate between a solid lubricating film and the substrate when used as lubricating material, there exists a problem in that bonding force is reduced at the boundary between the two and thereby the life time of the solid lubricating film is shortened.

Therefore, there exists a need of development in lubricating material suitable for use in vacuum, which is light in weight and long in life time of the solid lubricating film.

SUMMARY OF THE INVENTION

With these problems in mind, therefore, it is the primary object of the present invention to provide a lubricating material suitable for use in vacuum, which is light in weight and long in life time of solid lubricating film, that is, excellent in durability.

To achieve the above-mentioned object, the present invention provides a lubricating material used in space or vacuum, comprising: (a) a substrate made of titanium or titanium alloy; and (b) a solid lubricating film applied to a surface of the substrate to which oxidation treatment has been effected. The principal component of the oxide formed on the substrate surface by the oxidation treatment is $Ti_2O$. The oxidation treatment is effected by cleaning the substrate in hydrofluoric acid and then keeping the cleaned substrate at about 700 ($\pm$20)°C. for 10 or more hours.

Further, the present invention provides a method of making a lubricating material usable in space or vacuum, comprising the steps of: (a) preparing a titanium or titanium alloy substrate; (b) cleaning the substrate; (c) keeping the cleaned substrate at about 700° C. for at least 10 hours for oxidation treatment; and (d) applying a solid lubricating film onto the substrate. The substrate is a titanium alloy including 6 wt. % Al and 4 wt. % V; the substrate is cleaned by hydrofluoric acid; and the solid lubricating film is a 1 $\mu$m-thick $MoS_2$ film, for instance.

In the titanium lubricating material suitable for use in vacuum related to the present invention, before a solid lubricating film is applied onto the substrate of titanium or titanium alloy, since the substrate is cleaned by hydrofluoric acid, for instance, and held at 680° to 720° C. for 10 or more hours within a high temperature furnace for oxidation treatment so that a thin oxide layer ($T_2O$) can be formed on the substrate surface to increase a bonding force between the substrate and the solid lubricating film, the weight of the material can be reduced and the life time thereof can be increased sufficiently.

The substrate obtained by the above-mentioned oxidation treatment is relatively low in frictional coefficient without lubricant in a vacuum. Further, when a solid lubricating film is formed on the substrate by applying a solid lubricating film, it has been found that the lubrication life time is longer than that of AISI 440C.

In the titanium lubricating material suitable for use in vacuum related to the present invention, since the substrate is made of titanium or titanium alloy and additionally oxidation treatment is effected on the substrate surface before a solid lubricating film is applied onto the substrate surface, the oxide layer formed by the oxidation treatment can strengthen the bonding force between the substrate and the solid lubricating film, thus improving the life time of the solid lubricating film.

BRIEF DESCRIPTION OF THE DRAWINGS

FIG. 1 is a graphical representation showing the test results of dynamic friction coefficients of various test samples in a vacuum;

FIG. 2 is a graphical representation showing the test results of life time of solid lubricating film applied onto the surfaces of various test samples in a vacuum; and FIG. 3 is a graphical representation showing the analysis results of oxide formed on the substrate to which oxidation treatment has been effected according to the present invention, which are analyzed in accordance with X-ray diffraction technique.

DETAILED DESCRIPTION OF THE PREFERRED EMBODIMENTS

Embodiments of the present invention will be explained hereinbelow.

Frictional Coefficient Under Non-lubrication

Sample material of the present invention was obtained as follows:

Titanium alloy including 6 wt. % Al and 4 wt. % V was selected as the substrate; the selected substrate was cleaned in hydraulic acid and then held at 720° C. for 16 hours within a high temperature furnace in the atmosphere for oxidation treatment so that a thin oxide layer was formed on the surface of the substrate.

For comparison, the following comparative samples were also prepared:

Titanium alloy including 6 wt. % Al and 4 wt. % V was held at 750° C. for 20 hours in $N_2$ gas for nitriding treatment so that a thin nitride layer was formed on the surface of the substrate.

Titanium alloy including 6 wt. % Al and 4 wt. % V without any surface treatment was prepared; SUJ 2 of bearing steel without any surface treatment was prepared; and AISI 440C of martensite-based stainless steel without any surface treatment was prepared. The above-mentioned samples are listed in Table 1 below.

TABLE 1

| Substrate | Surface treatment | Surface treatment conditions |
|---|---|---|
| AISI 440C | None | — |
| SUJ 2 | None | — |
| Ti-6Al-4V | None | — |
| Ti-6Al-4V | Nitriding | at 750° C. for 20 hrs in $N_2$ gas |
| Ti-6Al-AV | Oxidation (Invention) | at 700° C. for 16 hrs in atm. |

The above five samples were tested to check dynamic friction characteristics under no lubrication conditions in a vacuum in accordance with a pin-desk test machine in which a pin is brought into pressure contact with the surface of a rotating disk formed of each of these samples under the test conditions as listed in Table 2 below.

TABLE 2

| Pin | AISI 440C 5/16 inch-ball |
|---|---|
| Load | 2N (about 200 g) |
| Speed | 0.5 m/s |
| Atm. | Vacuum ($5 \times 10^{-7}$ Torr or less) |
| Temp. | Room temp. |

FIG. 1 shows the test results of the above dynamic friction characteristics of these samples. FIG. 1 indicates that the dynamic friction coefficient of the sample according to the present invention (i.e. Ti-6% Al-4% V with oxidation treatment) is clearly lower than those of the other samples.

Life Time of Solid Lubricating Film

The life times (the number of times of sliding motions) of a solid lubricating film applied onto the substrate surfaces of the same test samples listed in Table 1, respectively were tested with the same pin-disk test machine under the test conditions as listed in Table 3 below. A 1 μm-thick $MoS_2$ (molybdenum disulfide) film was formed as the solid lubricating film onto each sample surface with a high-frequency sputtering apparatus.

TABLE 3

| Pin | AISI 440C 5/16 inch-ball |
|---|---|
| Load | 10N (about 1 kg) |
| Speed | 0.5 m/s |
| Atm. | Vacuum ($5 \times 10^{-7}$ Torr or less) |
| Temp. | Room temp. |

FIG. 2 shows the test results of the above life times of the solid lubricating film ($MoS_2$) applied onto these test samples. FIG. 2 indicates that the life time of the solid lubricating film applied onto the substrate to which oxidation treatment is effected is remarkably longer than those of other samples, that is, the same substrates to which no surface treatment is effected or nitriding treatment is effected or other material such as AISI 440C or SUJ 2.

Analyzed Results of Oxide Formed on Sample Surface

FIG. 3 shows the analyzed results of the surface oxidization substance of the substrate to which oxidation treatment is effected according to the present invention, in accordance with X-ray diffraction technique.

FIG. 3 indicates that the oxide formed on the substrate surface is not $TiO_2$, but $Ti_2O$ which is an unstable oxide. Therefore, it is possible to consider that the formation of $Ti_2O$ can markedly improve the bonding force between the substrate and the lubrication film. The mutual action between this surface oxide and the solid lubricating film is not yet well clarified; however, it may be due to the fact that some surface chemical reaction increases the bonding force between the lowermost layer of the solid lubricating film and the substrate and therefore the life time of the solid lubricating film can be improved.

In the titanium lubricating material suitable for use in vacuum according to the present invention, since oxidation treatment is effected to the surface of the substrate of titanium or titanium alloy before a solid lubricating film is applied, it is possible to provide a titanium substrate member small in dynamic friction coefficient in space or vacuum environment and long in solid lubricating film life time as compared with the conventional martensite-based stainless steels or bearing steels. In addition, since titanium or titanium alloy is used as the substrate, it is possible to reduce the weight thereof by about 43% as compared with the conventional iron substrate. Therefore, the material of the present invention is preferably usable not only for bearings of vacuum equipments such as electron microscopes, physical vapor deposition (PVD) apparatus, etc., but also lubricating members for space instruments which require light material in particular.

What is claimed is:
1. A lubricating material used in space or vacuum, comprising:
   a substrate made of titanium or titanium alloy;
   a coating of an oxide of said titanium formed over the surface of said substrate to increase bonding force of a solid lubricating film applied thereover; and
   a solid lubricating film formed over said oxide coating.

2. A lubricating material of claim 1, wherein a principal component of said oxide is $Ti_2O$.

3. A lubricating material of claim 1, wherein the oxide coating is formed by cleaning said substrate in hydrofluoric acid and then heating said substrate at about 700° C. for at least 10 hours.

4. A method of making a lubricating material usable in space or vacuum, comprising the steps of:
   (a) providing a titanium or titanium alloy substrate;
   (b) cleaning the substrate;
   (c) heating the substrate at about 700° C. for at least 10 hours to form a coating of titanium oxide; and
   (d) applying a solid lubricating film onto the titanium oxide coating,
   wherein said oxide increases bonding force of said lubricating film to said substrate.

5. The method of claim 4, wherein the titanium oxide is $Ti_2O$.

6. The method of claim 4, wherein the substrate is a titanium alloy including 6 wt. % Al and 4 wt. % V.

7. The method of claim 4, wherein the substrate is cleaned by hydrofluoric acid.

8. The method of claim 4, wherein the solid lubricating film is a 1 μm-thick $MoS_2$ film.

* * * * *